(12) United States Patent
Sanchez

(10) Patent No.: US 9,855,874 B2
(45) Date of Patent: Jan. 2, 2018

(54) PASSIVE HEAD SUPPORT DEVICE FOR A VEHICLE PASSENGER

(71) Applicant: Carlos Sanchez, Sahuarita, AZ (US)

(72) Inventor: Carlos Sanchez, Sahuarita, AZ (US)

(*) Notice: Subject to any disclaimer, the term of this patent is extended or adjusted under 35 U.S.C. 154(b) by 571 days.

(21) Appl. No.: 13/750,818

(22) Filed: Jan. 25, 2013

(65) Prior Publication Data

US 2013/0161996 A1 Jun. 27, 2013

Related U.S. Application Data

(63) Continuation of application No. 13/334,029, filed on Dec. 21, 2011.

(51) Int. Cl.
*B60N 2/48* (2006.01)

(52) U.S. Cl.
CPC ......... *B60N 2/4879* (2013.01); *B60N 2/4882* (2013.01)

(58) Field of Classification Search
USPC ....... 297/391, 392, 397, 398, 411.23, 411.25
See application file for complete search history.

(56) References Cited

U.S. PATENT DOCUMENTS

| | | | | | |
|---|---|---|---|---|---|
| 2,172,797 | A | * | 9/1939 | Lewallen | 297/392 |
| 2,492,383 | A | * | 12/1949 | Jones | 297/402 |
| 2,650,650 | A | | 2/1950 | Brown | |
| 2,501,993 | A | * | 3/1950 | Conradt | 297/410 |
| 3,226,159 | A | | 3/1965 | Binding | |
| 4,971,393 | A | * | 11/1990 | Maisenhalder | 297/397 |
| 5,967,613 | A | * | 10/1999 | McKeever | 297/397 |
| 6,305,749 | B1 | * | 10/2001 | O'Connor et al. | 297/397 |
| 6,394,544 | B1 | * | 5/2002 | Bieven et al. | 297/283.4 |
| 6,460,927 | B1 | * | 10/2002 | Groth | 297/284.9 |
| 6,547,333 | B2 | | 4/2003 | Parenteau et al. | |
| 6,935,695 | B2 | * | 8/2005 | Carta Gonzalez et al. | 297/397 |
| 7,938,491 | B2 | | 5/2011 | Montuore | |
| 8,141,955 | B1 | * | 3/2012 | Maassarani | 297/393 |

* cited by examiner

*Primary Examiner* — Sarah B McPartlin
(74) *Attorney, Agent, or Firm* — Jiarong L. Lamiquiz; Quarles & Brady LLP

(57) ABSTRACT

A device to support a passenger in a vehicle, where that device includes a U-shaped frame having a member extending outwardly from a first end of said frame, a securing mechanism extending outwardly from the frame to engage a portion of a passenger seat in the vehicle, and a cushion attached to the member.

10 Claims, 8 Drawing Sheets

PASSIVE HEAD SUPPORT DEVICE FOR A VEHICLE PASSENGER

CROSS-REFERENCE TO RELATED APPLICATIONS

This Application is a Continuation Application claiming priority to a United States Non-Provisional Application filed Dec. 21, 2011 and having Ser. No. 13/334,029.

FIELD OF THE INVENTION

The invention is directed to a head support device for use with a passenger seat disposed in a vehicle.

BACKGROUND OF THE INVENTION

Passengers in a vehicle, particularly young children, routinely fall asleep while traveling. When asleep, the passenger's head and/or upper body tend to slouch to one side or the other resulting in an uncomfortable, contorted sleeping position. Such slouching by the sleeping passenger may disturb other passengers as the sleeping passenger leans on other passengers, or the slouching may irritate the sleeping passenger themselves as they lean upon other parts of the vehicle, such as the door, window, armrest, etc for extended periods of time. Moreover, if there is no other passenger or parts of the vehicle to lean against, the sleeping passenger may completely slouch to one side, placing severe strain upon the sleeping passenger's back, side, neck, etc. Thus, the sleeping passenger cannot rest comfortably and upon waking, finds themselves amidst irritated passengers or with a sore neck, back, arms, etc. This unsupported slouching may, at an extreme, even cause injury.

It is generally well known that children's car seats often come equipped with side head rests/supports, which are one part of the child car seats many safety features and act to prevent injury to the child during a side impact. These side head rests also advantageously act to support a child's head should they fall asleep. However, as the child outgrows the car seat and moves to a booster seat or traditional adult restraint system, such as a lap and shoulder belt, there is no longer a side headrest to act as support while asleep. Thus, there is a long felt need for a vehicle passenger head support device to alleviate the shortcomings as described. Moreover, there is a need for a passive support device because, unlike active support devices in the prior art, a child will not generally permit an active support device such as, a head/neck support pillow, head straps, and the like to be coupled directly to the child.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Various representative implementations of the present invention may be applied to any passenger seat of any vehicle that may benefit from a device that supports a slouching passenger. By "passenger seat," Applicant means a seating assembly in combination with a head rest portion. Certain representative implementations for the device may include, for example: passenger seats in a car, a boat, a motor home, an airplane, a train, or any other vehicle that comprises a passenger seat.

Figure 1:
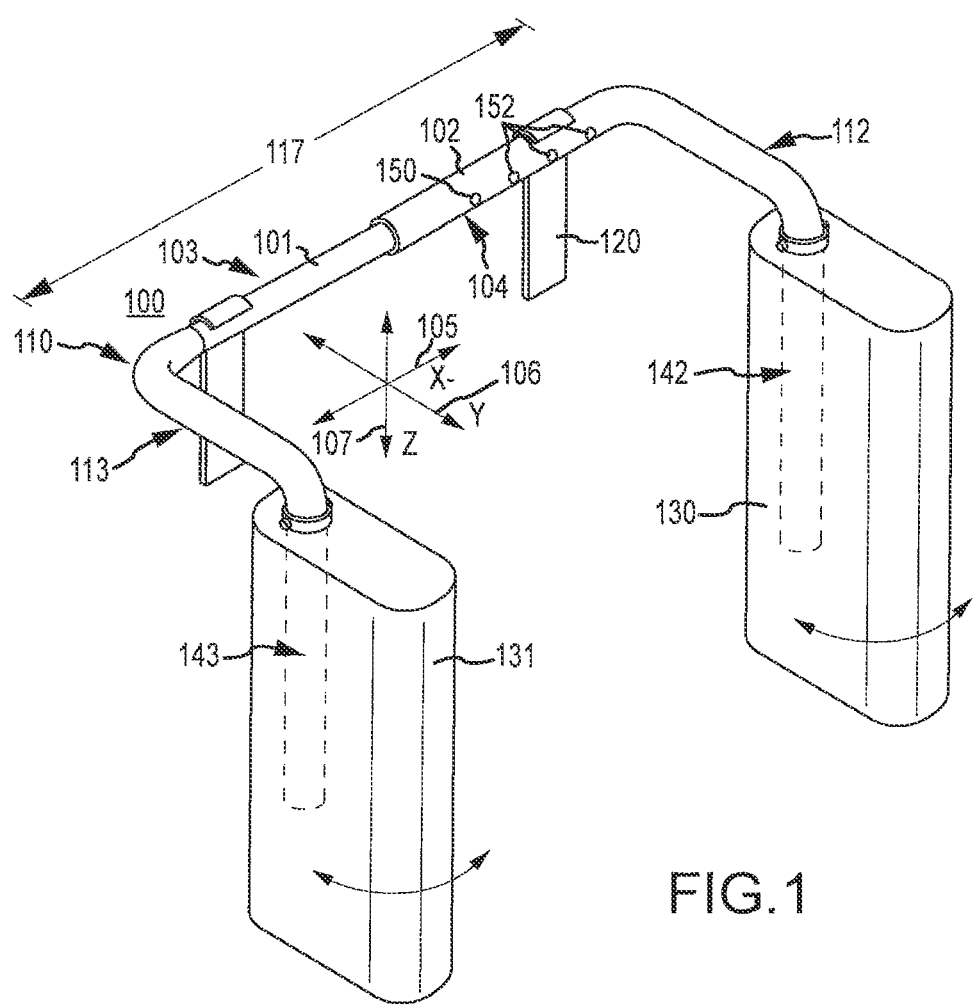
FIG. 1 representatively illustrates a passive support device used to support a slouching body position of a passenger in a vehicle.

Turning now to FIG. 1, FIG. 1 representatively illustrates support device 100 to support a slouching body position of a passenger in a vehicle. In an exemplary embodiment, support device 100 may comprise frame 110 having adjustable members 101 and 102 that are capable to conform frame 110 to a passenger seat, such as passenger seat 370 shown in FIGS. 3, 4, 6 and 7 of the vehicle (not shown), wherein first portions 103 and 104 of members 101 and 102 may be adjustable with respect to reference x-axis 105. To further conform frame 110 to the passenger seat, second portions 112 and 113 of members 101 and 102 may be adjustable with respect to reference y-axis 106. Support device 100 may also comprise securing mechanism 120 to secure frame 110 to the passenger seat, and device 100 may comprise support cushions 130 and 131 to cushion the slouching passenger. Support cushions 130 and 131 may encase at least a portion of and be rotatable about third portions 142 and 143 of members 101 and 102.

In accordance with exemplary embodiments, adjustable members 101 and 102 or any of the various elements of frame 110 may comprise of various natural or synthetic materials or combinations of both, such as, metals, metallic alloys, or plastic materials. For example, steel, aluminum, polycarbonate, bakelite, and the like are materials that may be used to provide rigidity for frame 110. In an exemplary embodiment, adjustable members 101 and 102 may be adjustable by any manner that allows the adjustable members to be adjusted and secured. For example, and with continued reference to FIG. 1, members 101 and 102 may comprise portions, such as first portions 103 and 104, which may be adjusted using a nested tubular configuration so that one portion, such as first portion 103, may slide within another portion, such as first portion 104, thereby establishing an overall length, such as overall length 117. Moreover, overall length 117, determined by adjusted portions 103 and 104, may be secured by any holding mechanisms to prevent movement. For example, adjustable portions 103 and 104 may be securely held in place by using various clamps, screws, bolts, nuts, springs, push buttons, friction fits, guides, pins, lock and keys, tabs, orifices, ties, and the like.

In an example of a holding mechanism and illustrated by FIG. 1, first portion 103 of adjustable member 101 may be nested and configured to slide within first portion 104 of adjustable member 102 to adjust overall length 117. As can be seen, first portion 103 comprises a typical push button mechanism 150, and as first portion 103 slides within first portion 104, push button mechanism 150 may engage at least one of a number of discretely spaced push button receptacles, such as push button receptacles 152. In this manner, overall length 117 may be adjusted and securely held.

It should be noted that the adjustability and holding mechanism of the exemplary embodiment described, with respect to first portion 103 of adjustable member 101 and first portion 104 of adjustable member 102, may be similarly applicable to other portions of the adjustable members, such as second portions 112 and 113, and third portions 142 and 143, wherein third portions 142 and 143 may be adjustable with respect to reference z-axis 107. In some exemplary embodiments, device 100 may comprise various adjustable portion combinations. For example, a frame may only comprise adjustable first portions, or the frame may comprise only adjustable first and third portions, or only adjustable first and second portions, etc. In addition, the frame may be manufactured in a custom manner such that the various portions are not adjustable.

In accordance with exemplary embodiments, frame 110 may comprise alternate manners to adjust the lengths of the various portions or frame members. For example, the various portion of the frame may comprise telescopic features.

Figure 2:
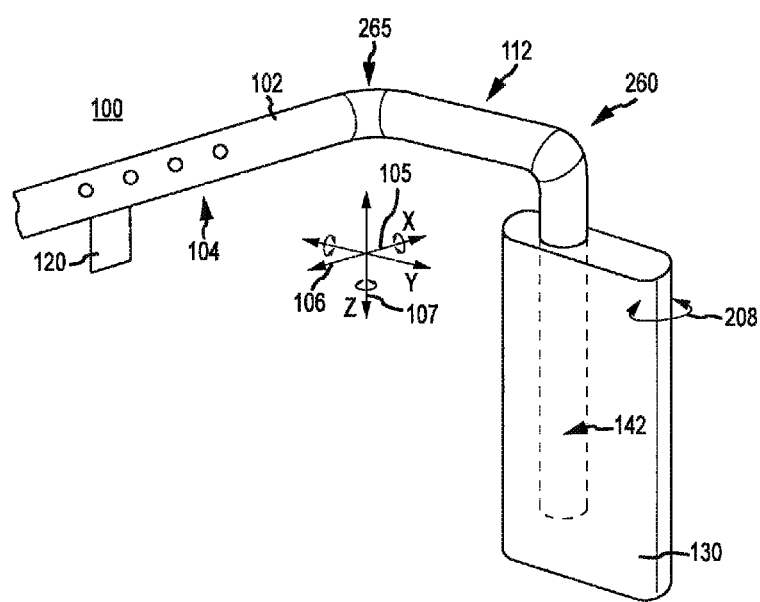
FIG. 2 representatively illustrates a portion of the passive support device showing exemplary pivotable aspects of the invention.

In accordance with exemplary embodiments, and turning now to FIG. 2, device 100 may be configurable in other manners other then merely the lengths as described above. For example, areas where the various member portions intersect may be pivotable so as to further tailor frame 110 to the passenger seat or the passenger. For example, first portion 104 and second portion 112 that intersect at intersection 265 may pivot with respect to one another. For example, intersection 265 may pivot in a direction about reference z-axis 107 and/or in a direction about reference x-axis 105. Similarly, second portion 112 and third portion 142 that intersect at intersection 260 may pivot with respect to one another. For example, intersection 260 may pivot in a direction about reference x-axis 107 and/or in a direction about reference y-axis 106.

In accordance with an exemplary embodiment and with continued reference to FIG. 2, support cushion 130 may also be adjustable. As mentioned, support cushion 130 may be adjustable with respect to reference z-axis 107, but third portion 142 of adjustable member 102 may likewise be adjustable with respect to reference z-axis 107. In this manner, third portion 142 may be adjustable or the support cushion itself may be adjustable with respect to reference z-axis 107. Moreover, support cushion 130 may rotate in a direction about reference z-axis 107, as shown by direction indicator 208. In this manner, support cushion 130 can be adjusted to further accommodate the passenger, either by rotating it, for this support cushion, in a clockwise direction to more securely support a slouching position of the passenger, or in a counter-clockwise direction to move support cushion 130 away from the passenger during non-use. In similar manner support cushion 131 (FIG. 1) may likewise be adjusted with respect to reference z-axis 107 or about third portion 143 of adjustable member 101.

Figure 3:
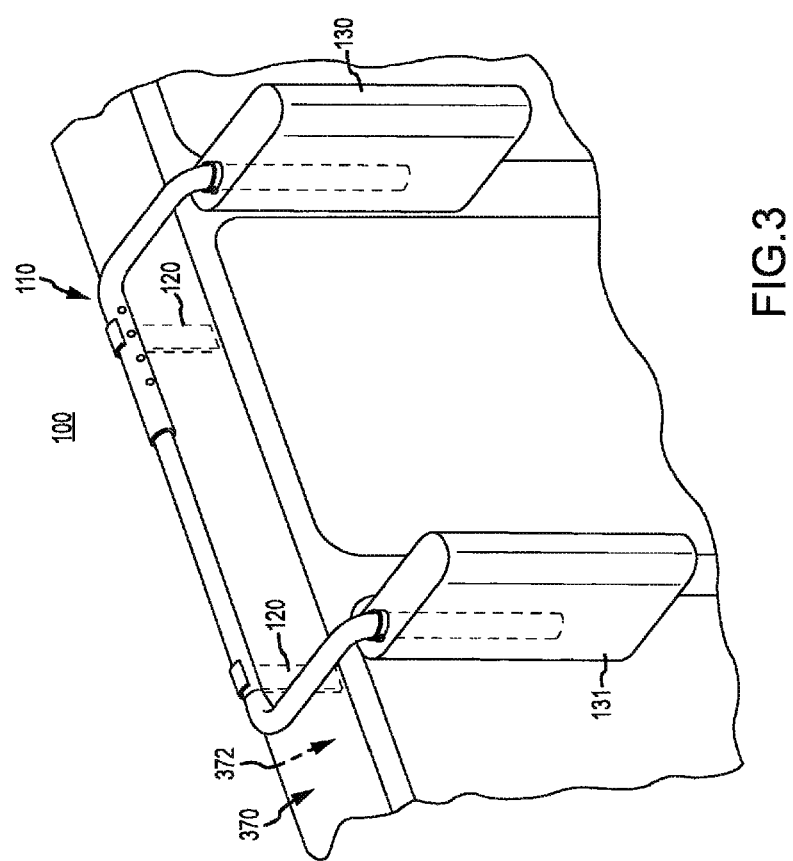
FIG. 3 representatively illustrates the passive support device secured to a passenger seat.

In accordance with an exemplary embodiment and with reference now to FIG. 3, device 100 may comprise securing mechanism 120 to secure frame 110 of device 100 to passenger seat 370 of the vehicle. In one representative embodiment, securing mechanism 120 may comprise of at least one clip that extends from a portion of frame 110, such as first portions 103 and/or 104. Securing mechanism 120 may extend from frame 110 a discrete distance, such that securing mechanism 120 engages at least a portion of backside 372 of passenger seat 370. In this manner, frame 110 is deterred from becoming dislodged from passenger seat 370 and frame 110 will maintain its position. For example, and with continued reference to FIG. 3, it can be seen how frame 110 is secured as securing mechanism 120 and support cushions 130 and 131 "sandwich" passenger seat 370 between them. The securing mechanism, as shown by clips 120 in FIGS. 1-3, is merely one exemplary securing mechanism, and other manners to secure frame 110 to passenger seat 370 may be used.

In accordance with an exemplary embodiment, securing mechanism 120 and perhaps portions of frame 110 may comprise additional securing features or comprise different securing mechanisms. In one example, securing mechanism (clips) 120 shown in FIGS. 1-3 may comprise additional pins, screws, hooks, adhesives, and the like to further secure frame 110 to passenger seat 370. For example, clips 120 and/or portions of frame 110 may comprise Velcro® type patches to engage "latch" frame 110 to fabric elements of passenger seat 370. If passenger seat 370 is comprised of a leather or vinyl type material, then patches of rubber or other "non-slip" type materials may be used to further inhibit movement of frame 110.

As mentioned, frame 110 may also comprise different securing mechanisms. For example and with reference to FIG. 4, frame 110 may comprise cylindrical members 481 and 482 extending outwardly therefrom, which may be of a similar configuration to typical studs coupled to or part of a headrest, such as head rest 487. In an embodiment, a headrest, such as head rest 487, may be removed and frame 110, comprising similar type studs, such as studs 481 and 482, may be positioned within the head rest stud receptacles, such as head rest stud receptacles 483 and 484. In this manner, frame 110 is secured to passenger seat 370.

Figure 4:
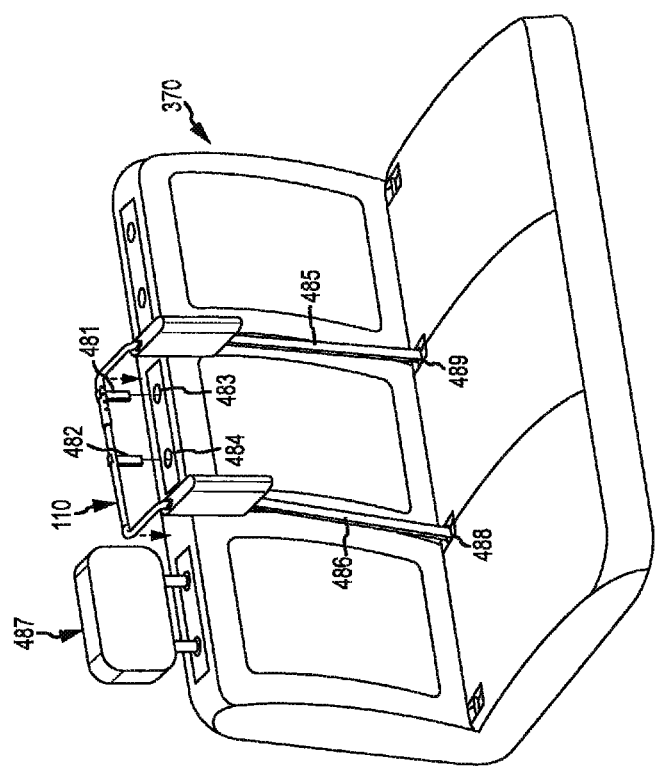
FIG. 4 representatively illustrates the passive support device secured by alternate manners to a passenger seat.
Figure 5:
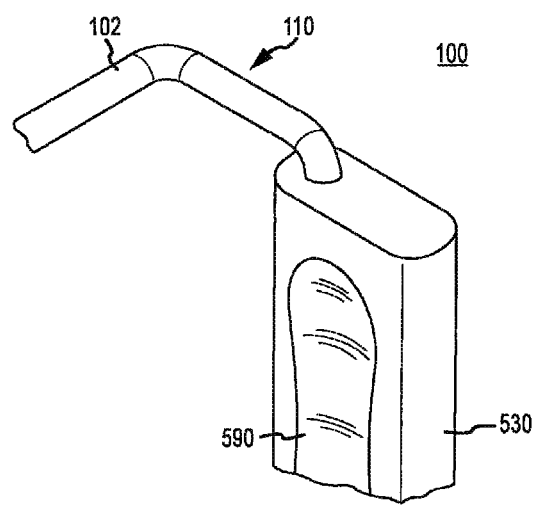
FIG. 5 representatively illustrates a contoured support cushion for the passive support device.

In yet another exemplary embodiment, frame 110 may comprise straps to secure frame 110 to passenger seat 370. With continued reference to FIG. 4, frame 110 may comprise straps 485 and 486. Straps 485 and 486 may be coupled to any portion of frame 110, but as shown in FIG. 4, straps 485 and 486 may be coupled to third portions 142 and 143 (not shown). To anchor frame 110 to passenger seat 370, the other end of straps 485 and 486 may be coupled to a secure portion of passenger seat 370. For example, straps 485 and 486 may be coupled to car seat anchors 488 and 489, but they may also be coupled to any other portion of passenger seat 370 that can secure the straps.

It should be noted that the securing mechanisms of device 100 are not limited merely by the exemplary embodiments described, but may comprise any other mechanisms that can secure the present invention to a passenger seat, whether now known or developed in the future. Moreover, device 100 is not limited to comprise of only one type of securing mechanism, but rather any combination of securing mechanisms may be employed. For example, device 100 may comprise any combination of securing mechanisms, such as clips 120, as shown in FIGS. 1-3, studs 481 and 482, and/or straps 488 and 489.

In accordance with an exemplary embodiment, device 100 may comprise cushioning materials/support cushions 130 and 131, as shown in FIGS. 1-5, 7 and 8 to support the slouching passenger. Cushions 130 and 131 may comprise various types of coverings and fillers, either natural or synthetic, to provide comfort. For example, cushions 130 and 131 may comprise various pliable foams, low viscous gel fillers, leather, vinyl, and the like, and any combinations thereof. In an exemplary embodiment and with reference to FIG. 5, cushion 530 may comprise contoured portion 590 to provide enhanced comfort to the slouching passenger. Moreover, and as stated, the cushion may comprise a low viscous gel filler, wherein the gel filler allows the cushion to conform to and mold itself about anatomical features of the slouching passenger as they apply a force of their weight to the cushion. In yet another exemplary embodiment, the cushions may comprise memory shape material, such that the cushion conforms to and molds itself about anatomical features of the slouching passenger as they apply a force of their weight to the cushion in similar fashion as the gel filled cushion described above. In this embodiment, though, the memory shape material returns to its normal configuration once the force of the weight of the slouching passenger is removed.

In accordance with various exemplary embodiments, the present invention comprises a passive device. The device does not interact with the passenger until the passenger falls asleep and/or slouches to one side. In this manner, the passenger is not restrained from movement while awake and can enjoy free movement. Unlike neck/head support pillows, restraining straps, helmets, etc., the present invention provides a unique manner in which to aide a sleeping/slouching passenger.

Throughout the specification, the present invention is described with reference to specific exemplary embodiments. Various modifications and changes may be made, however, without departing from the scope of the present invention as set forth in the claims. The specification and Figures are illustrative, rather than restrictive, and modifications or alternative configurations are intended to be included within the scope of the present invention. For example, the present invention (device 100) is described as comprising frame 110 having adjustable members 101 and 102, wherein members 101 and 102 comprise various portions, such as first portions 103 and 104, second portions 112 and 113, and third portions 142 and 143. However, other frame configurations may be employed without departing from the scope of the present invention. For example, instead of a frame having various adjustable portions, a frame may comprise of a number of separate elements having discrete lengths that may be assembled together to form the desired frame configuration.

Figure 6:
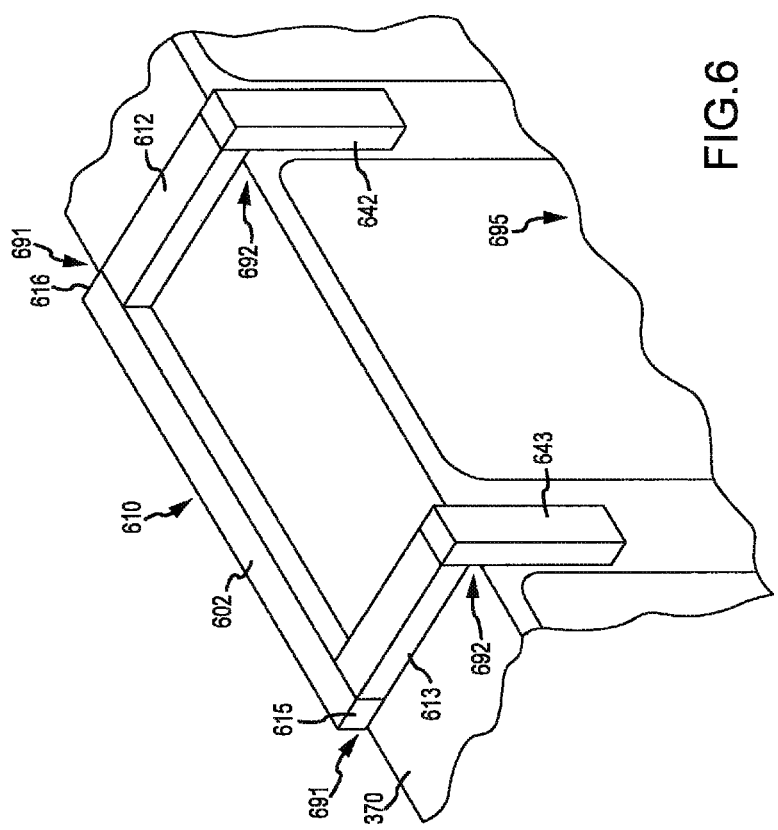
FIG. 6 representatively illustrates a passive support device comprising assembled frame members.
Figure 7:
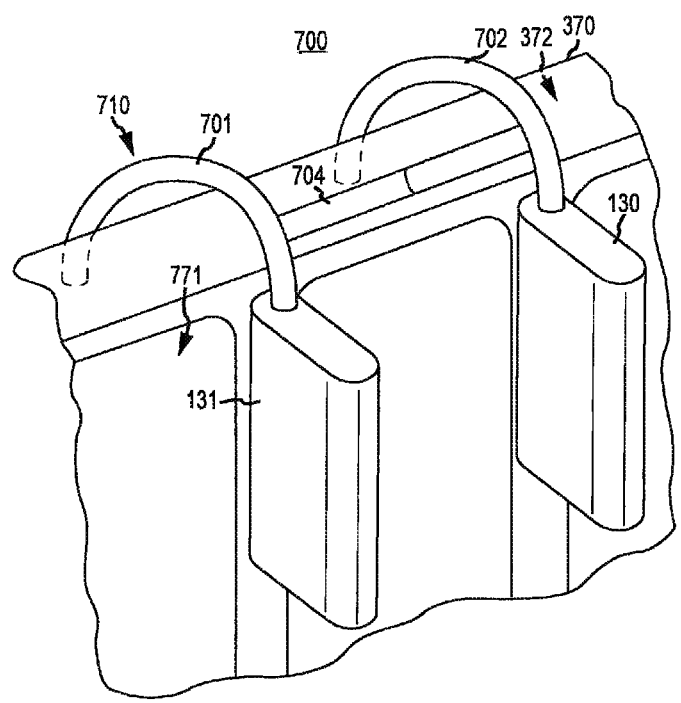
FIG. 7 representatively illustrates a passive support device comprising malleable frame members.

For example and with reference to FIG. 6, an assembled frame 610 of a device 600 may comprise a first portion 602 that may extend substantially horizontally along top rear 691 of passenger seat 370, a second portion 613 coupled to first end 615 of first portion 602, and third portion 612 coupled to second end 616 of first portion 602, wherein second portion 613 and third portion 612 may extend from their respective first and second ends of first portion 602 at top rear 691 of passenger seat 370 to top front 692 of passenger seat 370. Frame 610 may further comprise fourth and fifth portions 642 and 643 that couple, respectively, from second and third portions 612 and 613, and traverse substantially vertically along the height of passenger seat 370 from top front 692 of passenger seat 370 towards passenger seat bottom 695, wherein fourth and fifth portions 642 and 643 may be at least partially encased by a pliable cushioning material (not shown) to provide comfort to the passenger. Similar to previous exemplary embodiments, assembled frame 610 may comprise various securing mechanisms described to secure frame 610 to passenger seat 370.

In another exemplary frame embodiment a frame may comprise malleable frame members that "bend" to custom tailor the frame to a regular or irregular passenger seat. For example, and with reference to FIG. 7, frame 710 of a device 700 may comprise first member 701 and second member 702 coupled together by member 704. In the illustrated embodiment FIG. 7, first and second members 701 and 702 conform to passenger seat 370 from front 771 of passenger seat 370 to rear 372 of passenger seat 370; and support cushions 130 and 131 may couple to at least a portion of first and second members 701 and 702 at front 771 of passenger seat 370. In certain embodiments, device 700 provides malleable frame members such that frame 710 may be "bent" formed to any regular or irregular shaped passenger seat. Similar to previous exemplary embodiments, frame 710 may comprise various securing mechanisms described to secure frame 710 to passenger seat 370.

Figure 8:
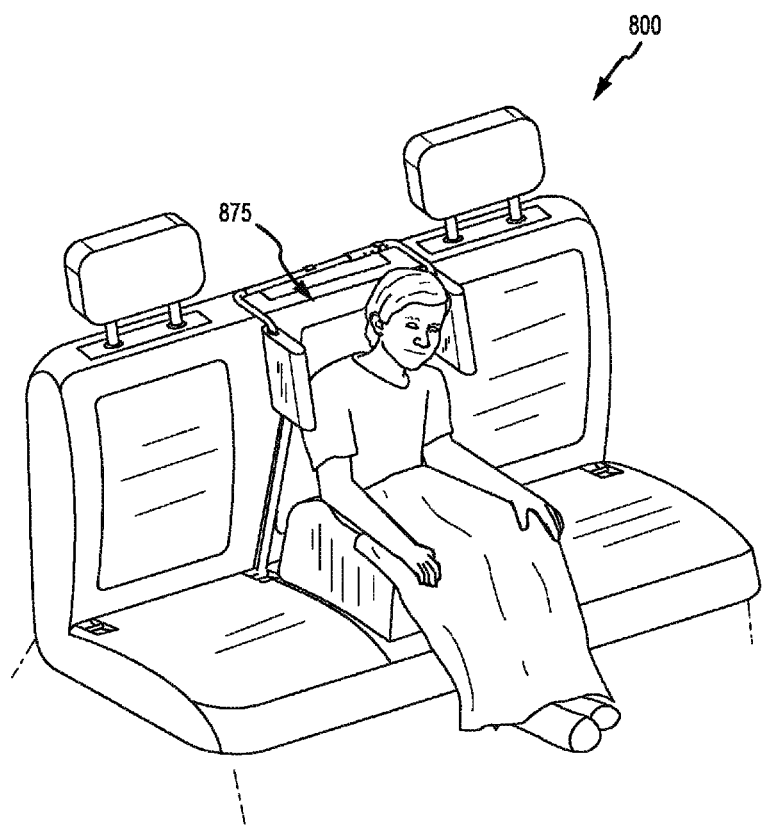
FIG. 8 representatively illustrates a passenger engaged with a passenger support device.

Turning now to FIG. 8, FIG. 8 representatively illustrates a manner by which slouching passenger 875 engages passive head support device 800 of the present invention. Passive head support device 800 is an exemplary embodiment of the present invention as described throughout the specification and may comprise similar elemental components as described and may operate in a similar fashion with respect to devices 100, 600, and/or 700. It is evident by FIG. 8 how passenger 875, when in a slouched position, is supported in a comfortable manner by device 800.

Furthermore, it is also clear how device 800 operates in a passive manner. If passenger 875 were not in the slouched (sleeping) position, passenger 875 would have generally unrestricted movement of their head, for example, to turn their head, lean forward, etc. It isn't until passenger 875 slouches to one side or the other that device 800 interacts with passenger 875.

In sum, the scope of the present invention should be determined by the claims and their legal equivalents rather than by merely the exemplary embodiments described. For example, the components and/or elements recited in any of the device claims may be assembled or otherwise operationally configured in a variety of permutations and are accordingly not limited to the specific configuration recited in the claims.

Moreover, benefits, other advantages and solutions to problems are described throughout the specification with regard to particular representative and exemplary embodiments; however, any benefit, advantage, solution to problem or any element that may cause any particular benefit, advantage or solution to occur or to become more pronounced are not to be construed as critical, required or essential features or components of any or all the claims.

While the preferred embodiments of the present invention have been illustrated in detail, it should be apparent that modifications and adaptations to those embodiments may occur to one skilled in the art without departing from the scope of the present invention as set forth herein.

I claim:

1. A device to support a passenger in a vehicle, comprising:
a first tubular member and a second tubular member in a nested configuration wherein a portion of said first tubular member is slidingly inserted into said second tubular member to define a U-shaped frame having a variable width and defining an X-Y plane and having a third member extending outwardly along a Z axis and directly from a first end of said U-shaped frame, wherein said Z axis is perpendicular to said X-Y plane;
a first securing mechanism extending outwardly from said U-shaped frame to engage a portion of a passenger seat in said vehicle;
a first cushion attached to said third member;
wherein:
said first cushion covers the entire third member;
said first cushion is configured to be positioned adjacent to a top of a car seat.

2. The device of claim 1, wherein said first cushion is moveable about said third member.

3. The device of claim 1, further comprising:
a fourth member extending outwardly from a second end of said U-shaped frame;
a second cushion attached to said second member;
wherein the first cushion and the second cushion sandwich the passenger seat between them.

4. The device of claim 3, wherein:
said second cushion is moveable about said fourth member; and
the first cushion and the second cushion are configured to support a head and a shoulder of a passenger sitting in said car seat.

5. The device of claim 3, wherein said first securing mechanism comprises an arcuate member.

6. The device of claim 5, further comprising a second securing mechanism extending outwardly from said frame to engage a portion of said passenger seat.

7. The device of claim 6, wherein said second securing mechanism comprises an arcuate member.

8. The device of claim 5, wherein said first securing mechanism comprises a first cylindrical member.

9. The device of claim 8, further comprising a second securing mechanism extending outwardly from said U-shaped frame to engage a portion of said passenger seat.

10. The device of claim 9, wherein said second securing mechanism comprises a second cylindrical member.

* * * * *